(12) United States Patent
Haskell et al.

(10) Patent No.: US 7,010,173 B2
(45) Date of Patent: Mar. 7, 2006

(54) VIDEO CODER EMPLOYING PIXEL TRANSPOSITION

(75) Inventors: Barin Geoffry Haskell, Tinton Falls, NJ (US); Atul Puri, Riverdale, NY (US); Robert Louis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 236 days.

(21) Appl. No.: 10/689,227

(22) Filed: Oct. 20, 2003

(65) Prior Publication Data

US 2004/0247194 A1 Dec. 9, 2004

Related U.S. Application Data

(63) Continuation of application No. 09/482,019, filed on Jan. 13, 2000, now Pat. No. 6,721,460.

(51) Int. Cl.
*G06T 5/00* (2006.01)
*G06T 9/00* (2006.01)
*H04N 5/911* (2006.01)
*H04N 5/917* (2006.01)

(52) U.S. Cl. .................... 382/268; 382/275; 382/248; 375/240.18; 375/240.26

(58) Field of Classification Search ............... 382/268, 382/275, 248, 250; 375/240.18, 240.19, 375/240.2, 240.24, 240.26, 240.27, 240.29
See application file for complete search history.

(56) References Cited

U.S. PATENT DOCUMENTS

| 5,422,964 A | * | 6/1995 | Devimeux et al. ......... 382/232 |
|---|---|---|---|
| 5,454,051 A | | 9/1995 | Smith ......................... 382/233 |
| 5,619,591 A | | 4/1997 | Tsang et al. ................ 382/166 |
| 5,737,448 A | * | 4/1998 | Gardos ....................... 382/240 |
| 5,757,969 A | | 5/1998 | Kim ........................... 382/236 |
| 5,764,805 A | | 6/1998 | Martuci et al. ............. 382/238 |
| 5,818,532 A | | 10/1998 | Malladi et al. ........ 375/240.03 |
| 5,850,294 A | | 12/1998 | Apostolopoulos et al. .. 382/250 |
| 5,852,682 A | | 12/1998 | Kim ........................... 382/233 |
| 5,881,180 A | | 3/1999 | Chang et al. ............... 382/268 |
| 6,052,490 A | * | 4/2000 | Haskell et al. .............. 382/268 |

OTHER PUBLICATIONS

International Organization for Standardisation; Generic Coding of Moving Pictures and Associated Audio Information: Video; Recommendation H.262; ISO/IEC 13818-2 JTC1/SC29/WG11 N0702(revised) Incorporating N702 Delta of Mar. 24 and Further Editorial Corrections May 10, 1994.

International Organization for Standardisation; MPEG-4 Video Verification Model Version 2.1; ISO/IEC JTC1/SC29/WG11 XXXX of May 3, 1996.

International Organization for Standardisation; Working Draft 4.0 of ISO/IEC 14496-2; ISO/IEC JTC1/SC29/WG11 N1797; MPEG97/Stockholm, Jul. 1997.

* cited by examiner

*Primary Examiner*—Scott A. Rogers

(57) ABSTRACT

A video encoding method and apparatus is shown wherein image information is represented as a plurality of pixels, the pixels are organized into blocks, pixels transposition is performed on image information at the boundaries of the blocks, the blocks are transform coded and quantized. Pixel transposition involves transposition of alternate pixels at the boundaries of blocks with pixels of neighboring blocks found in a pre-determined direction. The pre-determined direction may be fixed by a system or may be applied on an image by image basis. In the event that the pre-determined direction is not established by a system, a pixel transposition circuit includes a transposition keyword in the output bit stream which is used by a decoded to determine the direction of pixel transposition.

5 Claims, 2 Drawing Sheets

VIDEO CODER EMPLOYING PIXEL TRANSPOSITION

This is a continuation of U.S. application bearing the Ser. No. 09/482,019, filed Jan. 13, 2000, now U.S. Pat. No. 6,721,460.

BACKGROUND OF THE INVENTION

The present invention relates to block based video coding schemes and, most particularly, to a method of eliminating artifacts at block boundaries by transposing pixels at block boundaries with pixels from boundaries of neighboring blocks before coding.

Known systems for coding video information advantageously employ transform coding of a plurality of blocks or macro blocks. In such systems, image data often are filtered, broken down into a luminance component and two chrominance components, and organized into blocks of image data. For example, according to the proposed MPEG-4 video standard, image data are organized first into blocks, each containing an 8 pixel by 8 pixel array of data, then into macro blocks including up to four luminance blocks and two chrominance blocks. The blocks of image data are then transform coded from a pixel domain to an array of transform coefficients and scaled by a quantization parameter and transmitted in an output bit stream.

Block-based transform coding is preferred over other known coding schemes, such as wavelet coding, because it is relatively less complex to implement. However, such block-based transform coding causes annoying artifacts in the reconstructed image. Quantization parameters may be established for each block or macro block of image data. Differences in quantization parameters among the various blocks or macro blocks result in distortion at the block boundaries. For instance, in flat image areas, such distortions impose a patchwork effect on reconstructed image data. Similar artifacts appear in image areas having heavy texture, but are less noticeable. Block based coding with variable quantization causes additional artifacts to arise, such as chromo-bleeding, "mosquito-noise" and "ringing" artifacts.

Prior systems have attempted to ameliorate the effect of such artifacts by low pass filtering reconstructed image data at block boundaries. However, while low pass filtering reduces block artifacts, it also causes blurring of image data. Low pass filtering impairs image quality.

There is a need in the art for an image coder that advantageously employs block-based transform coding and quantization but reduces image artifacts at block boundaries. Further, there is a need in the art for a coding scheme that reduces artifacts without unnecessarily blurring image data.

SUMMARY OF THE INVENTION

The disadvantages of the prior art are alleviated to a great extent by an image coding scheme that employs block-based transform coding and quantization. An encoder transposes pixels across block boundaries in a predetermined direction prior to transform coding. For example, alternate pixels along a boundary of a first block may be transposed with adjacent pixels in a diagonal direction of neighboring blocks. After transposition, each reformed block undergoes transform coding and quantization.

A decoder performs reverse operations of those employed by the encoder. Each coded block is dequantized and coded by an inverse transform to reconstruct blocks of pixel information. At the conclusion of the inverse transform, pixels that were subject to transposition are returned to the neighboring blocks from which they originated. After transposition, each block may be processed further for display.

The pixel transposition reduces image artifacts at block boundaries and improves image quality, particularly in flat image areas. By including cross border pixels in the transform coding and quantization, the transform coding and quantization are performed with greater uniformity on image data.

DETAILED DESCRIPTION

Figure 1A:
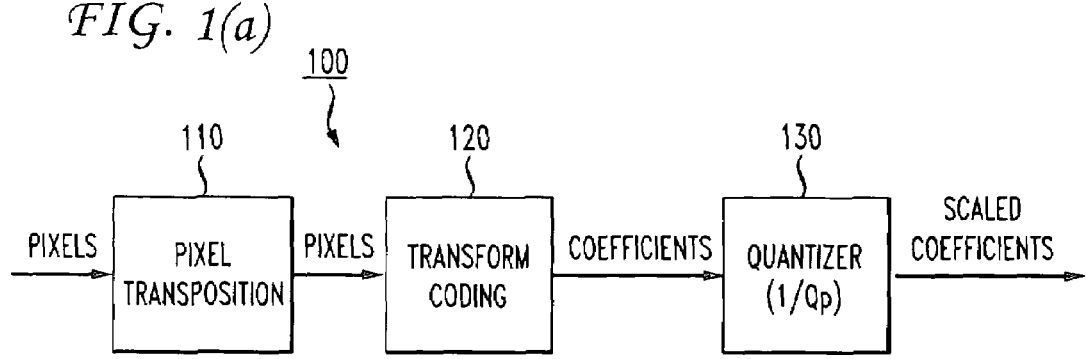
FIGS. 1(a) and 1(b) respectively illustrate an encoder 100 and a decoder 200 according to an embodiment of the present invention.

Turning to FIG. 1(a), circuitry of an encoder 100 is illustrated therein constructed in accordance with an embodiment of the present invention. Blocks or macro blocks of image data are input to a pixel transposition circuit 110. Each block possesses one of luminance or chrominance image data. The pixel transposition circuit 110 transposes specific pixels from the boundary of each block or macro block with pixels from its neighbors. The pixel transposition circuit 110 then outputs reconstituted blocks of pixel data to a transform coder 120. The transform coder 120 performs a transform of the block data from a pixel domain to a domain of coefficients representative of the pixel data. For example, the transform coder 120 may perform a discrete cosine transform as is known in the art. The transform coder 120 outputs blocks of coefficient data to a quantizer 130. For each block or macro block, the quantizer 130 generates a quantizer parameter ($Q_p$) based upon the bandwidth of a channel available to transmit the coded image data. The quantizer 130 scales the coefficients of the block by the quantization parameter. The quantizer 130 outputs blocks of scaled coefficient information and the quantization parameters generated for each for further processing and transmission.

Figure 1B:
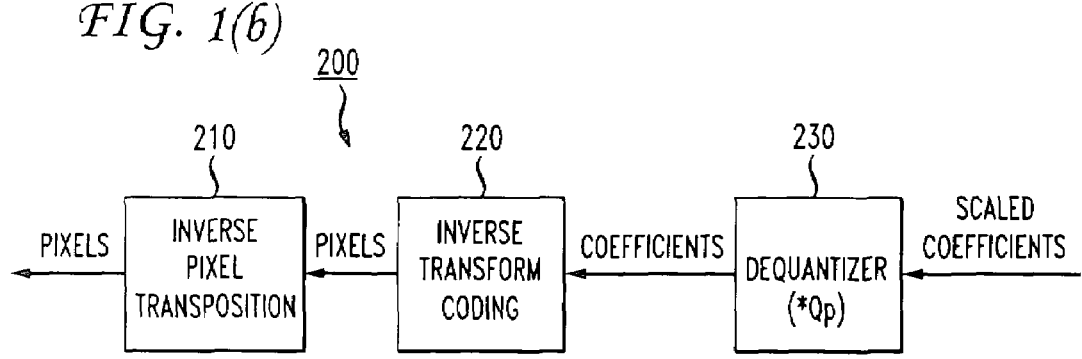

FIG. 1(b) illustrates circuitry of a decoder 200 constructed in accordance with an embodiment of the present invention. Blocks of scaled coefficients are isolated from the transmitted bit stream and input to a dequantizer 230. The dequantizer 230 identifies the quantization parameter for each block and scales the scaled coefficients of the block by the quantization parameter. Where the quantizer 130 may have divided each coefficient by Qp, the dequantizer multiplies the scaled coefficients by the same Qp to obtain the original coefficients. The dequantizer 230 outputs reconstructed coefficient data to an inverse transform coding circuit 220. The inverse transform coding circuit 220 transforms the coefficients back to the pixel domain, such as by discrete transform coding. The inverse transform coding circuit 220 outputs blocks or macro blocks of reconstructed pixel data to an inverse pixel transposition circuit 210. For each block or macro block, the inverse pixel transposition circuit 210 transposes pixels along its boundary with pixels of its neighbors in a direction complementary to the process applied by the pixel transposition circuit 110. The inverse pixel transposition circuit 210 returns pixels to their original position in the neighboring blocks or macro blocks. The inverse pixel transposition circuit 110 outputs blocks of pixel information for further processing and display.

Figure 2A:
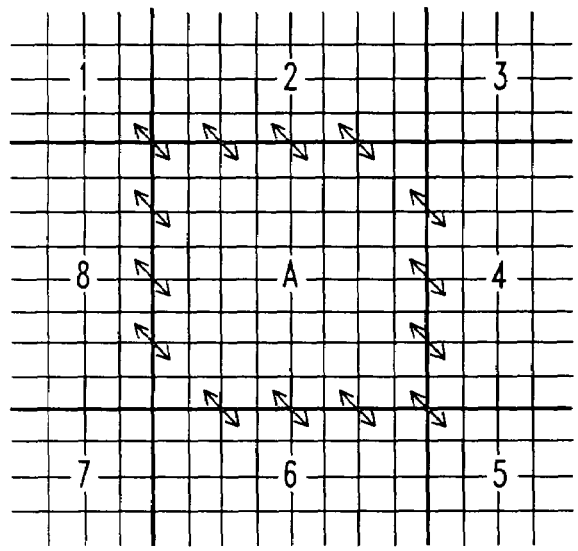
FIGS. 2(a) and 2(b) respectively illustrate the pixel transposition operation of the present invention as applied to blocks and macro blocks of image data.
Figure 2B:
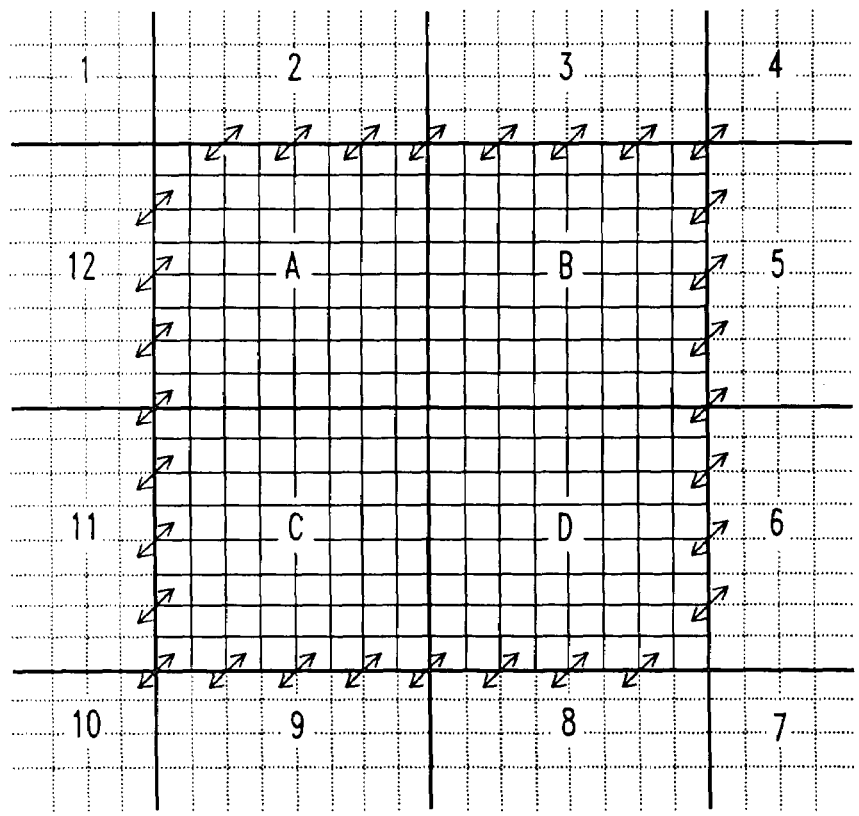

An example of a pixel transposition process is shown in FIG. 2(*a*) applied on a block by block basis. For each block A, the pixel transposition circuit 110 stores, in memory, pixel information from a plurality of surrounding Blocks 1–8. The pixel transposition circuit 110 transposes pixel information in a predetermined direction. In the example of FIG. 2(*a*), the pixels are transposed along a diagonal direction from high-left to low-right and vice versa.

Under the pixel transposition process, each alternate pixel on the edge of a given block A is transposed with a pixel across the block boundary in the predetermined direction. In the example of FIG. 2(*a*), the pixel in the upper left-hand corner of block A is transposed with a pixel in the lower right-hand corner of block 1. Three pixels along the upper edge of block A are transposed with pixels on the lower edge of block 2 in the same diagonal direction. Alternate pixels found on the right-hand edge of block A are transposed with pixels on the left-hand edge of block 4 in the diagonal direction. The pixel in the lower right-hand corner of block A is transposed with a pixel in the upper left-hand corner of block 5. Alternate pixels on the lower edge of block A are transposed with pixels on the upper edge of block 6 in the diagonal direction. Finally, alternate pixels on the left hand edge of block 8 are transposed with pixels found on the right-hand edge of block 8 in the diagonal direction.

Pixel transposition is performed only on like-kind data. When performing pixel transposition on a luminance block, the pixel transposition circuit 110 considers only neighboring luminance blocks for transposition. Similarly, for blocks of each of the two chrominance signals, pixel transposition is performed only with neighboring chrominance image blocks of the same type.

FIG. 2(*b*) illustrates an example where pixel transposition is performed on a macro block by macro block basis. In the event that the quantizer circuit 130 computes quantization parameters for each macro block rather than for each block, it is preferable to perform a pixel transposition on a macro block by macro block basis. In this example, a macro block consists of four blocks of image information, Blocks A–D. The macro block is surrounded by twelve neighboring blocks, Blocks 1–12. For the macro block, pixel transposition is performed on alternate pixels on the boundary of the macro block with pixel information of neighboring macro blocks along a pre-determined direction. In this example, the predetermined direction is from low-left to high-right and vice versa. As shown in FIG. 2(*b*), the pixel in the upper right-hand corner of Block B is transposed with a pixel in the lower left-hand corner of Block 4. Similarly, a pixel in a lower left-hand corner of Block C is transposed with a pixel in the upper right-hand corner of Block 10. Alternate pixels on the top edge of the macro block, the top edges of Blocks A and B, are transposed with pixels on the bottom edges of Blocks 2 and 3 in a diagonal direction. Pixels on the right-hand edge of the macro block, the right-hand edges of Blocks B and D, are transformed on the left-hand edges of Blocks 5 and 6 in the diagonal direction. Blocks on the lower edge of the macro block, the lower edges of Blocks C and D, are transposed with pixels found in the diagonal direction on the upper edges of Blocks 8 and 9. Finally, pixels found on the left-hand edge of the macro block, the left-hand edges of Blocks A and C, are transposed with pixels found in a diagonal direction in the right-hand edges of Blocks 11 and 12.

The direction of transposition is arbitrary. Any direction may be applied. In addition to high-left to low-right and low-left to high-right, horizontal (right to left) and vertical (above to below) directions may be applied. The direction may be predetermined by the system or defined for each coded video frame. If the direction of transposition is variable, the pixel transposition circuit 110 includes a transposition keyword in the output bitstream identifying the direction of transposition. The decoder identifies the transposition keyword and identifies a directions of transposition therefrom.

So, too, the pattern of transposition may varied. In addition to selection of alternate pixels for transposition, every third or every fourth pixel may be selected for transposition. Further, the pattern may varied so as to select pixels at a first rate, such as every other pixel, in a first region of data, then a second rate, such as every fourth pixel, in a second region of data.

The encoder 100 and decoder 200 shown in FIGS. 1(*a*) and 1(*b*) are not full video coders. Preprocessing is generally performed on pixels before they are input to the pixel transposition circuit 110, which generally involves sampling of image data, conversion to a digital format, filtering, and component isolation. Preprocessing also includes organization of the component signals into blocks. However, in a preferred embodiment, preprocessing functions may be merged into the pixel transposition circuit 110. In this case, the pixel transposition circuit may be programmed to reorder pixels before they are organized into blocks.

We claim:

1. A method for coding a video signal comprising:
   receiving rectangular blocks of image data, each block including rows of pixels forming a pixel array with rows and columns, with pixels of one row of said array forming an upper designated row, pixels of another row of said array forming a lower designated row, pixels of one column of said array forming a left designated column, and pixels of another column of said array forming a right designated column;
   processing the image data of at least one block by transposing some, but not all, of the pixels of the designated rows and columns of said at least one block with the designated rows and columns of adjacent other blocks of image data, thereby forming a modified block of image data; and
   transforming the image data of said modified block to form transform coefficients representative of said modified block of image data.

2. The method of claim 1 where said upper designated row of said block is the upper-most row of said block, the lower designated row of said block is the lower-most row of said block, the left designated column of said block is the left-most column of said block, and the right designated column of said block is the right-most column of said block.

3. The method of claim 1 where approximately half of the pixels in said designated rows and columns are transposed.

4. The method of claim 1 where
   said step of receiving blocks of image data receives blocks that derive from an image that was partitioned into an rectangular array of pixel blocks, thereby creating an upper neighboring block, a lower neighboring block, a left neighboring block and a right neighboring block for most of said blocks, and
   said step of transposing pixels in the upper designated row of said block is with pixels in the upper neighboring block, transposing pixels in the lower designated row of said block is with pixels in the lower neighboring block, transposing pixels in the left designated column is with pixels in the left neighboring block, and transposing pixels in the right designated column is with pixels in the right neighboring block.

5. The method of claim 1 where said step of receiving blocks of image data receives blocks that derive from an image that was partitioned into an rectangular array of pixel blocks, thereby creating an upper neighboring block, a lower neighboring block, a left neighboring block and a right neighboring block for most of said blocks, and said step of transposing pixels in the upper designated row of said block is mostly with pixels in the upper neighboring block, transposing pixels in the lower designated row of said block is mostly with pixels in the lower neighboring block, transposing pixels in the left designated column is mostly with pixels in the left neighboring block, and transposing pixels in the right designated column is mostly with pixels in the right neighboring block.

* * * * *